(12) United States Patent
Dearth et al.

(10) Patent No.: US 11,038,800 B2
(45) Date of Patent: Jun. 15, 2021

(54) TECHNIQUES FOR REDUCING THE OVERHEAD OF PROVIDING RESPONSES IN A COMPUTING NETWORK

(71) Applicant: Nvidia Corporation, Santa Clara, CA (US)

(72) Inventors: Glenn Dearth, Santa Clara, CA (US); Mark Hummel, Santa Clara, CA (US); Jonathan Owen, Santa Clara, CA (US); Mike Osborn, Santa Clara, CA (US); John Wortman, Santa Clara, CA (US); Rich Reeves, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 120 days.

(21) Appl. No.: 16/553,511

(22) Filed: Aug. 28, 2019

(65) Prior Publication Data
US 2021/0067449 A1 Mar. 4, 2021

(51) Int. Cl.
| | |
|---|---|
| *H04L 12/801* | (2013.01) |
| *H04L 7/00* | (2006.01) |
| *H04L 12/743* | (2013.01) |
| *H04L 12/947* | (2013.01) |
| *G06F 13/16* | (2006.01) |
| *G06F 13/30* | (2006.01) |
| *G06F 13/42* | (2006.01) |

(52) U.S. Cl.
CPC .......... *H04L 47/12* (2013.01); *G06F 13/1642* (2013.01); *H04L 7/0008* (2013.01); *H04L 45/7457* (2013.01); *H04L 49/25* (2013.01); *G06F 13/1689* (2013.01); *G06F 13/30* (2013.01); *G06F 13/4234* (2013.01)

(58) Field of Classification Search
None
See application file for complete search history.

(56) References Cited

U.S. PATENT DOCUMENTS

| | | | | |
|---|---|---|---|---|
| 8,854,851 | B2 * | 10/2014 | Rodriguez | G11C 15/00 365/49.17 |
| 2003/0188035 | A1 * | 10/2003 | Lubbers | H04L 67/1095 719/310 |
| 2004/0003127 | A1 * | 1/2004 | Hensbergen | H04L 69/325 709/251 |
| 2011/0246686 | A1 * | 10/2011 | Cavanagh, Jr. | G06F 13/28 710/22 |

(Continued)

*Primary Examiner* — Jamaal Henson

(57) ABSTRACT

An endpoint in a network may make posted or non-posted write requests to another endpoint in the network. For a non-posted write request, the target endpoint provides a response to the requesting endpoint indicating that the write request has been serviced. For a posted write request, the target endpoint does not provide such an acknowledgment. Hence, posted write requests have lower overhead, but they suffer from potential synchronization and resiliency issues. While non-posted write requests do not have those issues, they cause increased load on the network because such requests require the target endpoint to acknowledge each write request. Introduced herein is a network operation technique that uses non-posted transactions while maintaining a load overhead of the network as a manageable level. The introduced technique reduces the load overhead of the non-posted write requests by collapsing and reducing a number of the responses.

41 Claims, 6 Drawing Sheets

(56) References Cited

U.S. PATENT DOCUMENTS

2016/0188500 A1* 6/2016 Morris ................ G06F 13/1673
           711/154
2019/0138465 A1* 5/2019 Kalyanasundharam .....................
           G06F 13/30

* cited by examiner

TECHNIQUES FOR REDUCING THE OVERHEAD OF PROVIDING RESPONSES IN A COMPUTING NETWORK

TECHNICAL FIELD

This application is directed, in general, to managing network transactions and, more specifically, to managing non-posted network transactions in an interconnect fabric.

BACKGROUND

Posted write requests are the most efficient form of a network transaction from a network load perspective because they do not require a response from their targets. But the posted write requests have potential synchronization and resiliency issues because the sources of the write requests cannot know whether their write requests have been received, and let alone successfully completed at the target.

Unlike posted write requests, non-posted write requests require a response for every request and do not suffer from the synchronization or resiliency issues. Non-posted write requests, however, suffer from the load and bandwidth issue as the responses increase the load overhead and reduce the bandwidth of the network. What is desired is a method and a device that can reduce the load overhead of the network while effectively managing the synchronization and resiliency issues.

SUMMARY

One aspect of the disclosure provides a method of operating a fabric. The method includes forwarding requests from a source endpoint to a target endpoint and forwarding responses of the requests from the target endpoint to the source endpoint, wherein a number of the responses is less than a number of the requests.

Another aspect of the disclosure provides a device for operating a fabric. The device includes a pipeline configured to forward requests from a source endpoint to a target endpoint and forward responses of the requests from the target endpoint to the source endpoint and a collapsing structure connected to the pipeline and configured to reduce a load of the responses on the fabric, wherein a number of the responses is less than a number of the requests.

BRIEF DESCRIPTION

Reference is now made to the following descriptions taken in conjunction with the accompanying drawings, in which.

DETAILED DESCRIPTION

Introduced herein are a method and a device for reducing the load on a network while maintaining its synchronization and resiliency. The introduced method and device ("technique") has been developed for a network such as an interconnect fabric, where a bulk synchronization of requests and responses is acceptable. "Bulk synchronization" is a synchronization method that determines when an entire batch of write requests has completed, without knowledge of when individual requests making up that batch have completed. The introduced technique reduces the increased load overhead of the non-posted write requests by collapsing and reducing a number of the responses that belong to a same stream.

The introduced technique also effectively deals with complexities in a certain network, where transaction tag remapping is required. In a network such as an interconnect fabric, a stream identifier of each packet e.g., a write request and/or a response, may not be sufficient to indicate which stream it belongs to and may cause confusion in tracking the transactions and corruption in crossing the transactions. By remapping the tags of the transactions based on their associations with particular collapsible and non-collapsible streams, the introduced technique eliminates both the confusion and the corruption.

The introduced technique provides structures that optimize the hardware resource. For example, the introduced tracking structures optimizes the hardware resource for toggling counters by configuring each open counter to track multiple streams at a time, and the introduced source-track structures optimizes the hardware resources for closed counters and timers by sharing time-multiplexed closed counters and timers.

The introduced technique effectively addresses the synchronization between the source and target endpoints. By tracking both transactions and flush requests of multiple streams, the introduced technique can identify when transactions of a certain stream have completed and synchronization events (flushes) can be allowed to complete. Based on this identification, the introduced technique timely and correctly responds to the tracked flush request and achieves the synchronization of transaction activities between the source and target endpoints.

The introduced technique increases the system resiliency by providing an efficient/timely check for lost transactions. The introduced technique tracks transactions of a particular stream and checks if the tracked transactions have completed in a predefined time period. If all the transactions do not clear within the time period, the introduced technique assumes that at least one of the transactions has been lost and triggers remedial actions.

Figure 1:
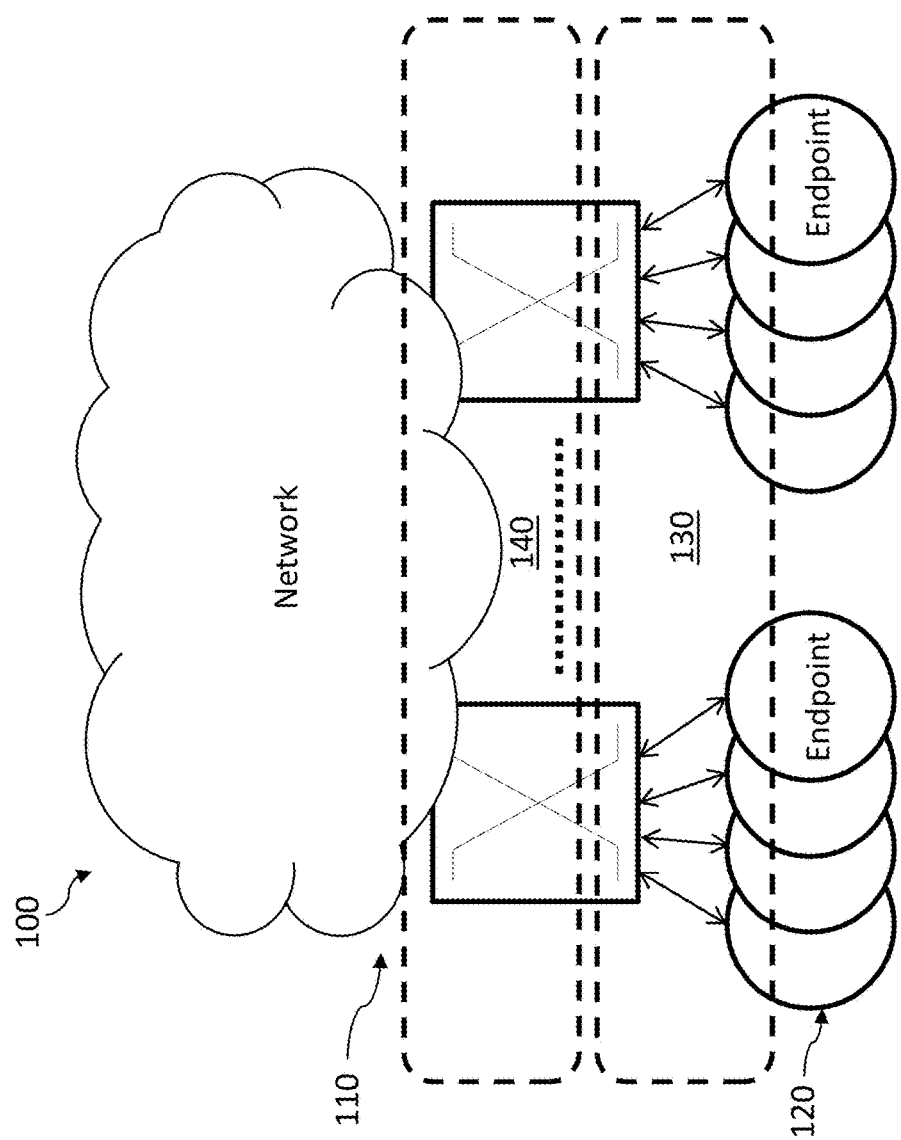
FIG. 1 is a system diagram of an embodiment of an interconnect fabric.

FIG. 1 illustrates a system diagram of an embodiment of an interconnect fabric 100. The term "interconnect fabric" refers to a network of devices, such as switches, that connect multiple endpoints/processors that communicate with one another using a communication protocol or link such as NVLink™ provided by NVIDIA® Corporation of Santa Clara, Calif.

In the illustrated embodiment, the interconnect fabric 100 includes a network of switches represented by switches 110 that connect multiple endpoints/processors 120 over a communication protocol. An area 130 covering connections between each endpoint 120 and the respective network of switches 110 is called "edge" of the interconnect fabric 100 and an area 140 that covers connections between the switches 110, e.g., L1 switches, and other switches (not shown), e.g., L2 switches, is called the "core" of the interconnect fabric. The interconnect fabric 100 and the endpoints 120 can be part of a server or servers, such as in a data center. The endpoints 120 can be within a single server, within multiple servers within a single rack, or distributed across multiple server racks. The switches 110 can be NVSwitches of NVIDIA®, and the endpoints 120 can be processing units such as graphics processing units (GPUs) and central processing units (CPUs), storage units such as memories, and/or networking units such as network interface cards.

In the illustrated embodiment, some of the endpoints 120 are labeled as source endpoints and some are labeled as target endpoints. The source endpoints are endpoints that are making requests to other endpoints and the destination/target endpoints are endpoints to which such requests are directed. Although they are labeled as such, each of the endpoints 120 can make either read or write request to any of the endpoints connected to the interconnect fabric and they can also respond to any of the endpoints in the interconnect fabric. In other words, while each of the endpoints 120 can be both source and target endpoints. The "transaction" includes a pair of a request and a response, and the transaction "completes" when a request is responded to.

Figure 2:
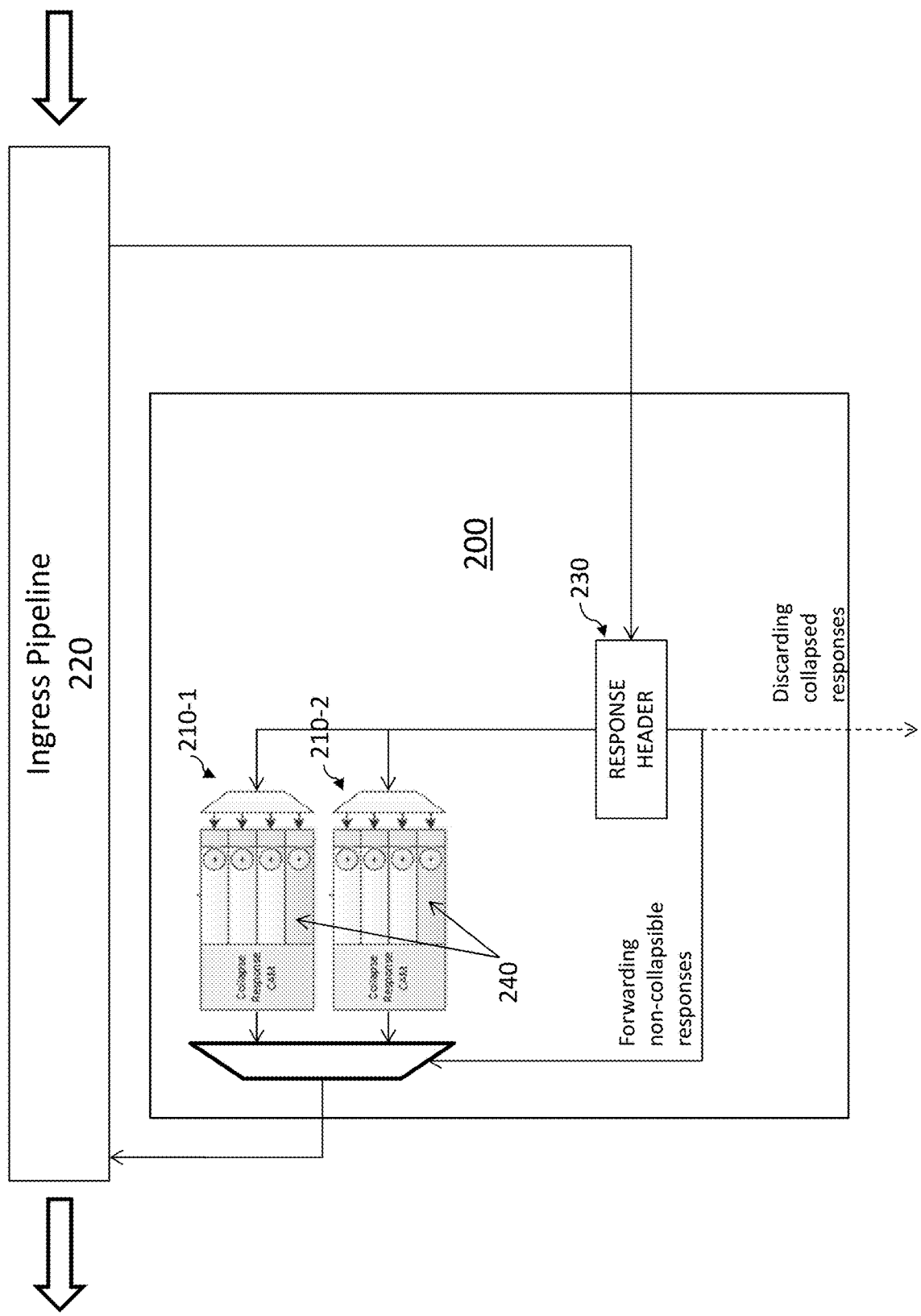
FIG. 2 is a block diagram of an embodiment of a collapsing structure implemented according to the principles of the disclosure.

FIG. 2 illustrates a block diagram of a collapsing structure (CS) 200 implemented according to the principles of the disclosure. For situations where a bulk synchronization of request-response is acceptable, the CS 200 reduces the increased transaction overhead of the non-posted transactions by collapsing multiple responses into a reduced set of responses. The CS 200 collapses some of the responses that belong to a common source/process stream into a single packet. The CS 200 may be implemented as a hardware circuit in a switch or an endpoint such as 110 or 120 in FIG. 1. In the illustrated embodiment, the CS 200 is implemented in a last hop switch that is directly connected to a target endpoint.

The CS 200 includes two memories 210-1 and 210-2, e.g., content-addressable memories (CAMs), and is coupled to an ingress pipeline 220. Each of the memories 210s is configured to determine whether a response 230, which is traveling through the pipeline 220, is a collapsible response and if so, compare the response 230 to responses 240 stored in the memories to see if the response 230 belongs to the same stream as any of the stored responses 240.

The collapsibility of the response 230 is indicated by its TCEnable bit. For example, '1' indicates that the response 230 is collapsible and '0' indicates the response 230 is not collapsible. To determine whether the responses 230, 240 belong to the same stream, their stream identifiers, e.g., tagIDs and/or extTagIDs, which are stored in their header portion, are compared. If the stream identifiers match, the corresponding memory 210 increments a collapse count the stored response 240 by a collapse count of the response 230. Once the collapse count of the stored packet 240 has been incremented, the response 230 can be dropped because its effect on the stream protocol has been accounted for. If the tagIDs of the responses 230, 240 do not match, one of the memories 210s stores the response 230 for comparison with future responses.

In the illustrated embodiment, when the stored response 240 either reaches the maximum collapse count or some other hold duration timer is exceeded, the response 240 is forwarded back to the source. The maximum collapse count or the hold duration is determined based on the tradeoff between the added latency and the rate of load reduction. For example, while a longer storage time may reduce the load further, it may introduce more latency and slow down the network more, impacting the overall system performance. In some embodiments where a number of responses for a particular stream may be estimated from monitoring the request stream in the opposite direction, the stored response for that particular stream may be maintained until all other responses arrive. It is understood that in addition to the maximum collapse count and the hold duration timer, there may be other triggers for forwarding the stored response 240 back to the source.

The CS 200 may be implemented at various collapsing sites between the source and target endpoints for further collapsing of the responses. It should be noted that there are various policies that can be applied at these sites. For example, the maximum collapse counts may be adjusted to improve the overall response reduction and the efficiency at the collapsing sites. It is understood that there may be ordering requirements among responses to be passed through such as a requirement to process collapsible responses ahead of non-collapsible responses that would otherwise be bypassed. In that case, triggering one set of stored responses may require draining other stored responses first.

Figure 3:
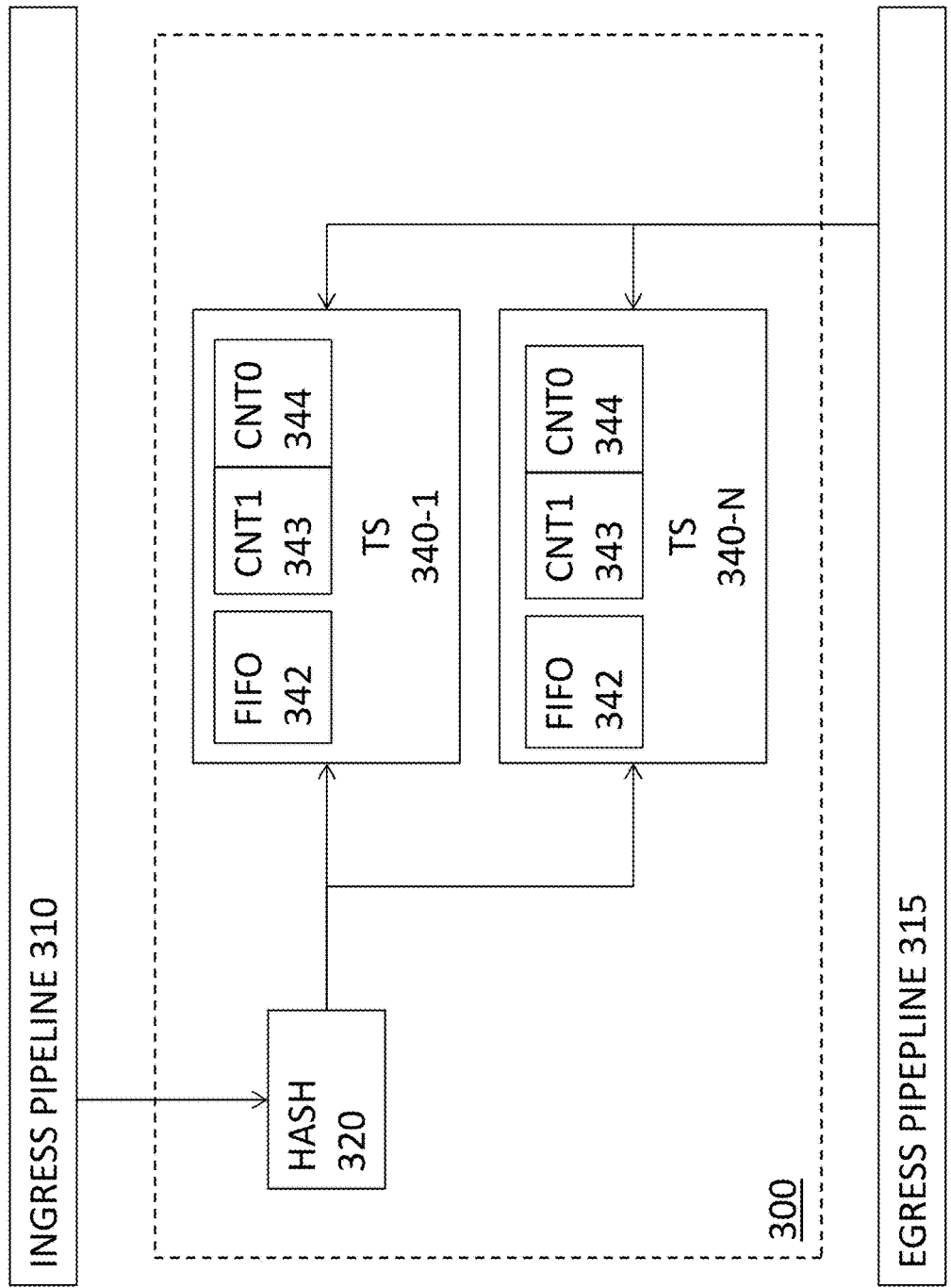
FIG. 3 is a block diagram of an embodiment of a tracking structure system implemented according to the principles of the disclosure.

FIG. 3 illustrates a block diagram of an embodiment of a tracking structure system (TSS) 300 implemented according to the principles of the disclosure. Unlike the traditional tracking method which employs a same number of tracking structure as the number of streams being tracked, the TSS 300 employs a smaller number of tracking structures than the number of streams being tracked. Each tracking structure tracks transactions and flush requests of multiple streams using a pair of toggling (opposite-state) counters. A flush refers to a hardware operation of a counter in the tracking structure, the completion of which guarantees that all transactions in a particular stream have completed. A flush is caused by arbitrary software barrier periodically inserted into streams of transactions. The TSS 300 synchronizes the stream activities at the source endpoint and the target endpoint by responding to each flush request, e.g., performing a flushing, when all transactions that came before each flush request are completed. The TSS 300 may be implemented as a hardware circuit in a switch or an endpoint, such as 110 or 120 in FIG. 1. In the illustrated embodiment, the TSS 300 is located at the edge of the network, in a first-hop switch that is directly connected to a source endpoint. The TSS 300 is connected to an ingress pipeline 310 and an egress pipeline 315 and includes a hash structure 320 and a plurality of tracking structures 340.

In the illustrated embodiment, the hash structure 320 is configured to assign transaction streams to multiple tracking structures (TS) 340. For example, the hash structure 320 may perform a hash algorithm, e.g., Mod-2 hash, to on the stream identifier, e.g. tagID, to evenly assign the streams across the available tracking structures 430. Based on the available hardware resources, e.g., the number of the tracking structures, the hash structure can assign one or more streams to each tracking structure. It is understood that it would be ideal to assign one stream per tracking structure for the best, e.g., most precise tracking, performance.

In the illustrated embodiment, each of the TS 340s includes a first-in, first-out buffer (FIFO) 342 and a pair of counters 343, 344. The FIFO 342 is configured to track the flush requests between the outstanding transactions in the fabric by receiving and queuing flush requests. For each flush request received, the FIFO 342 waits until all the write requests that preceded the flush request have been responded to before responding to the flush request.

As mentioned above, the counters 343, 344 are toggling (opposite-state) counters, with one e.g., 343, being an open counter and the other counter, e.g., 344, being a closed counter. To indicate which stream of transactions is tracked by which counter, each counter 343, 344 has a different extended stream identifier e.g., extTagID, which moves with the open/close state of the counter. For example, the open counter is currently assigned extTagID=1 and the closed counter is assigned extTagID=0. When the counters switch states, the assigned extTagID follows them, i.e. the open counter now has extTagId=0 and the closed counter has extTagID=1.

The open counter, e.g., 343, is configured to track both write requests and responses of the assigned streams by incrementing its count when a write request is received and decrementing when a response is received. The closed counter, e.g., 344, is configured to only track a response of the assigned streams by decrementing its counter when a response is received. The counters 343, 344 are decremented by the value of the collapse count in the received response. When the closed counter decrements to zero, it indicates that all of the write requests being tracked by the closed counter have been responded.

The counters 343, 344 are also configured to transition to opposite states, e.g., from the closed state to the open state and vice versa, based on a count of the closed counter count when a flush request arrives at the FIFO 342. For example, if the closed counter count is either empty or zero when a flush request arrives, the counters 343, 344 transition to the opposite states right away. But if the closed counter count is not zero when a flush request arrives, the counters 343, 344 wait for the closed count to reach zero before transitioning. While waiting, the open counter remains open but is marked to indicate that it needs to transition as soon as the closed counter reaches zero. If additional flush requests arrive while waiting, these flush requests are queued in the FIFO 342, and the last one of the requests is tagged so that the open counter knows that it needs to respond up to that last request when it transitions to a closed counter. When the closed count reaches zero, all the flush requests in the FIFO 342 that had arrived while the closed counter was an open counter, are responded and the counters 343, 344 transition to the opposite states.

It is understood that the transitioning can be implemented as swapping counts of the counters, e.g., the count of the former open counter is moved to the new closed counter and the count of the new open counter is set to zero, and updating extended identifiers of transactions to be tracked by the new open counter.

Figure 4:
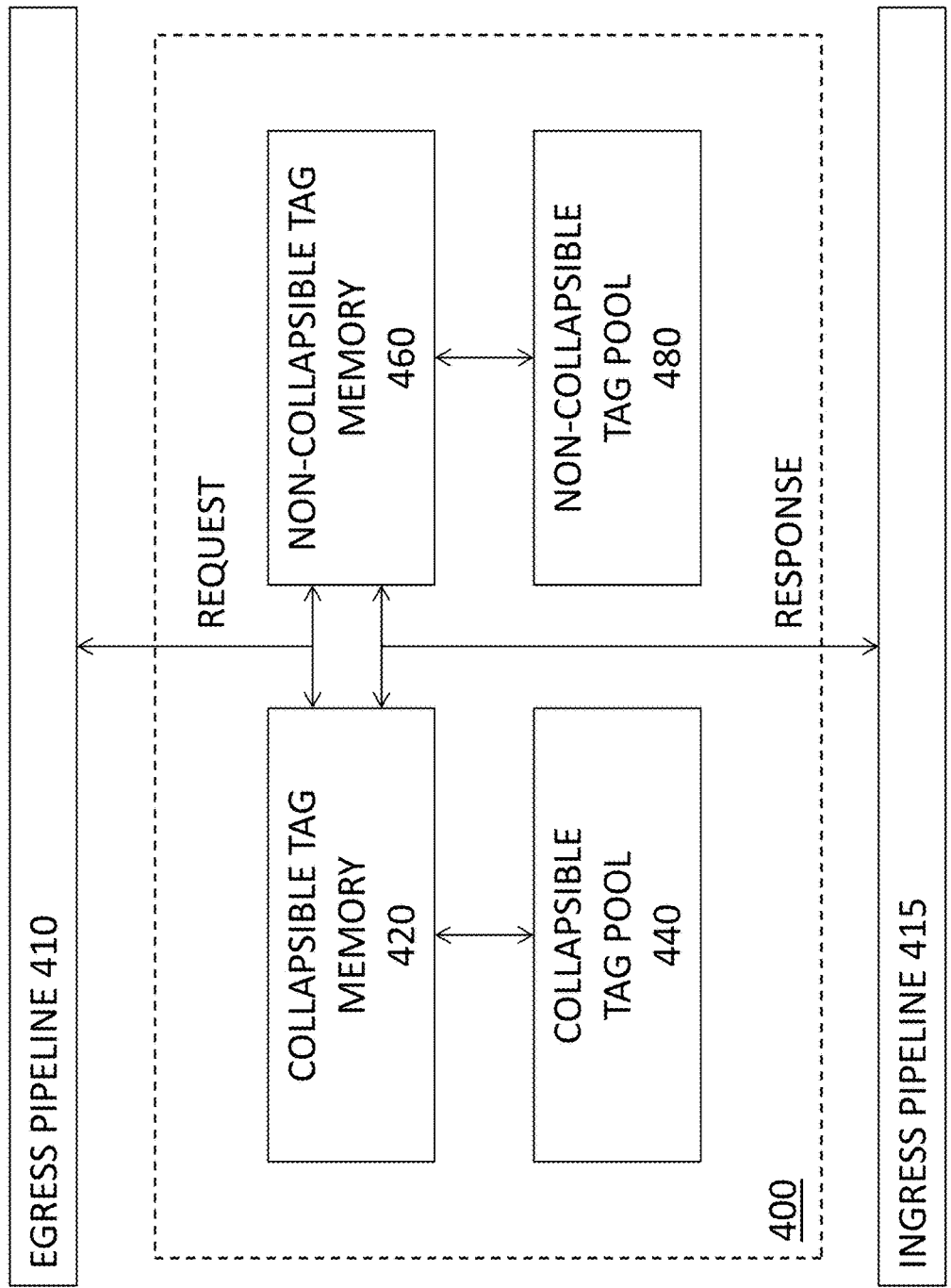
FIG. 4 is a block diagram of an embodiment of a tag remapping structure implemented according to the principles of the disclosure.

FIG. 4 illustrates a block diagram of a tag remapping structure (TRS) 400 implemented according to the principles of the disclosure. As shown in FIG. 1, an interconnect fabric may be connected to many endpoints. But in the fabric, each endpoint in the fabric is only aware of the other device, e.g., an endpoint or a switch, it is communicating with, and a stream identifier of each transaction may not indicate which stream it belong to and may not be unique. The TRS 400 is configured to remap transactions from multiple streams in a way that the transactions do not corrupt from either crossing transactions of different streams or crossing collapsible and non-collapsible transactions. The TRS 400 performs the remapping at packet rate to avoid stopping the transaction flow and cause network backups.

The TRS 400 may be implemented as a hardware circuit in a switch or an endpoint such as 110 or 120 in FIG. 1. In the illustrated embodiment, the TRS 400 is implemented on a last-hop switch that is directly connected to a target endpoint. The TRS 400 is coupled to an egress pipeline 410 and an ingress pipeline 415 of the switch.

In the illustrated embodiment, the TRS 400 includes a collapsible tag memory 420, a collapsed tag pool 440, a non-collapsible tag memory 460, and a non-collapsible tag pool 480. The collapsible tag memory 420 may be a content-addressable memory that is configured to remap a write request traversing the egress pipeline 410 based on a stream and a collapsibility of the write request. As the first step of the remapping, the collapsible tag memory 420 sees if the write request's response can be collapsed. This is determined by checking the TCEnable bit of the request. For example, '1' TCEnable bit may indicate the request is a collapsible request, and '0' may indicate that the request is a non-collapsible request.

If the request is not collapsible, the original stream identifier of the request is changed with a unique stream identifier from the non-collapsible tag pool 480 and released onto the pipeline 410 to be delivered to the target endpoint. If the request is collapsible, the collapsible tag memory 420 checks to see if the stream that the request belongs to is already being tracked in the collapsible tag memory 420. This may be determined by comparing the original stream identifier of the request to original stream identifiers of requests that are associated with streams already being tracked in the collapsible tag memory 420. If the original stream identifier of the request matches one of the stored original stream identifiers, i.e. the request belongs to one of the streams being tracked in the collapsible tag memory 420, the collapsible tag memory 420 provides a unique stream identifier that has been assigned to that one stream from the collapsible tag memory and increments a tracked collapse count for that one stream.

If the stream that the request belongs to is not being tracked in the collapsible tag memory 420, the original stream identifier of the request, e.g., tagID of the request, is inserted into the collapsible tag memory 420 and provided with a unique stream identifier from the collapsible tag pool 440. Also if the stream that the request belongs to is not being tracked in the collapsible tag memory 420 but the original stream identifier of the request cannot be inserted into the collapsible tag memory 420 because it is full, the request is "spilled" to the non-collapsible tag pool 480 as the request is changed to a non-collapsible request and provided with a non-collapsible remap tag from the non-collapsible tag pool 480. A collapsible request may be changed to a non-collapsible request by changing the request's TCEnable bit, e.g., from 1 to 0.

Whenever a request is remapped with a unique stream identifier, the original stream identifier and other information about the request are extracted and stored in a respective memory, e.g., the collapsible tag memory 420 or the non-collapsible tag memory 460. This allows a response of the remapped request to be retagged with the original stream identifier when the response comes back to the TRS 400. As such, when a non-collapsible response comes back to the TRS 400, the response is retagged with its original stream identifier retrieved from the non-collapsible tag memory 460 and its unique stream identifier is returned to the non-collapsing tag pool 480. For a returning collapsible response, it is retagged with its original stream identifier from the collapsible tag memory 420 and the tracked collapse count for the respective stream is decremented by the value of the collapse count in the response. The value of the collapse count is present in the collapse CNT field in the header of the response. It is understood that if a request was "spilled" to the non-collapsible tag pool 480 and changed to non-collapsible, its response is restored to collapsible, e.g., by changing the TCEnable bit back to 1.

Figure 5:
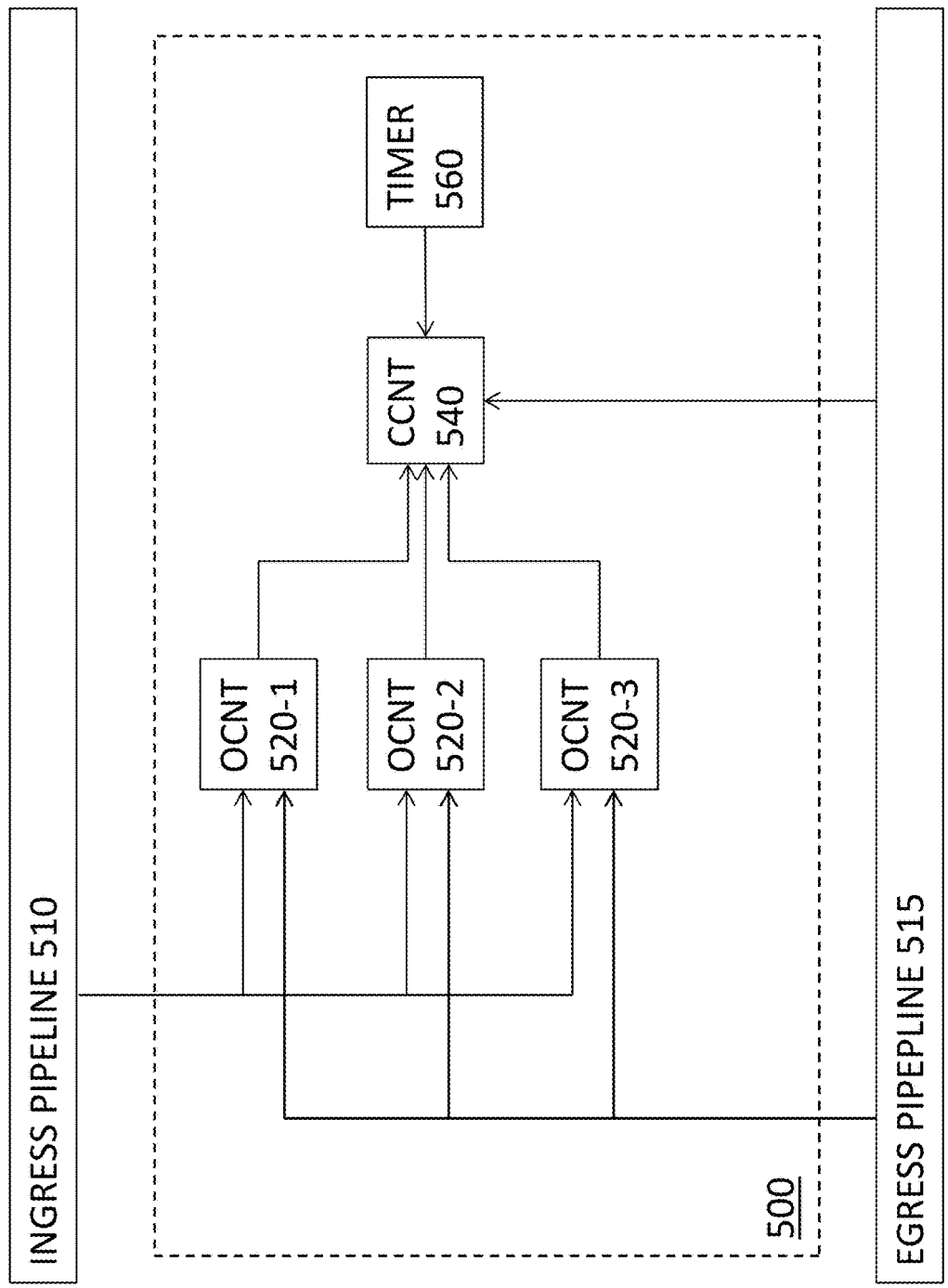
FIG. 5 is a block diagram of an embodiment of a source-track structure implemented according to the principles of the disclosure.

FIG. 5 illustrates a block diagram of an embodiment of a source-track structure (STS) 500 implemented according to the principles of the disclosure. The STS 500 detects errors in a particular stream by determining whether all transactions of the particular stream are completed within a predetermined time period. The STS 500 operates a pair of counters and an associated timer, and may be implemented as a hardware circuit in a switch or an endpoint such as 110 or 120 in FIG. 1. In the illustrated embodiment, the STS 500 is implemented on a first-hop switch that is directly connected to a source endpoint. The STS 500 is connected to an ingress pipeline 510, from which the STS 500 receives a request, e.g., a non-posted write request, and an egress pipeline 515, from which the STS 500 receives a response. The STS 500 includes a plurality of open counters 520s, one closed counter 540, and a timer 560.

Each of the open counters 520s is configured to track transactions of a particular stream by incrementing its count when a write request of the particular stream is received and decrementing when a response of the particular stream is received. Each open counter 520 is also configured to reset, e.g., transition to a closed counter, by moving its count to the closed counter 540 and zeroing count. Resetting may occur sequentially, from the first open counter 520-1 to the third open counter 520-3 or vice versa based on the instruction from the STS 500. It is understood that the number of the open counters is not limited to 3 and can be any positive integer.

The closed counter 540 is configured to receive a transaction count of a particular stream from each of the open counters 520s and continue to track the transactions of the particular stream. Similar to the open and counters such as 343, 344 in FIG. 3, the extended stream identifier of the open counter 520 travels with transaction count over the transition. Unlike the open counter 520s, the closed counter 540 is only capable of decrementing the count when a response of the particular stream is received. In the illustrated embodiment, only one closed counter 540 is provided since it is time-multiplexed and shared by the three sequentially operating open counters 520s. Both the open and closed counters 520, 540 decrement by a collapse count value of the received response.

The timer 560 is configured to start when one of the open counters transitions to the closed counter, i.e. when the count of one of the open counters 520s is moved to the closed counter 540, and stop when the closed counter 540 reaches zero. If the closed counter 540 does not reach zero before the timer 560 expires, e.g., after a predetermined time period, the timer 560 assumes at least one of the transactions, e.g., responses, of the particular stream being tracked has been lost and notifies the source endpoint of the particular stream of such. Notifying allows the source endpoint and the tracking structure, e.g., 340 in FIG. 3, to get rid of the transactions of the particular stream and continue processing so that their operations do not stall.

In the illustrated embodiment, the timer 560 is similarly time-multiplexed and hence synchronized with the closed counter 540. It is understood that by sequentially operating the open counters 520s and time-multiplexing the closed counter 540 and the timer 560, it can achieves significant hardware optimization. Varying a number of closed counters and timers, an appropriate balance between the hardware optimization and the error tracking precision can be achieved.

Figure 6:
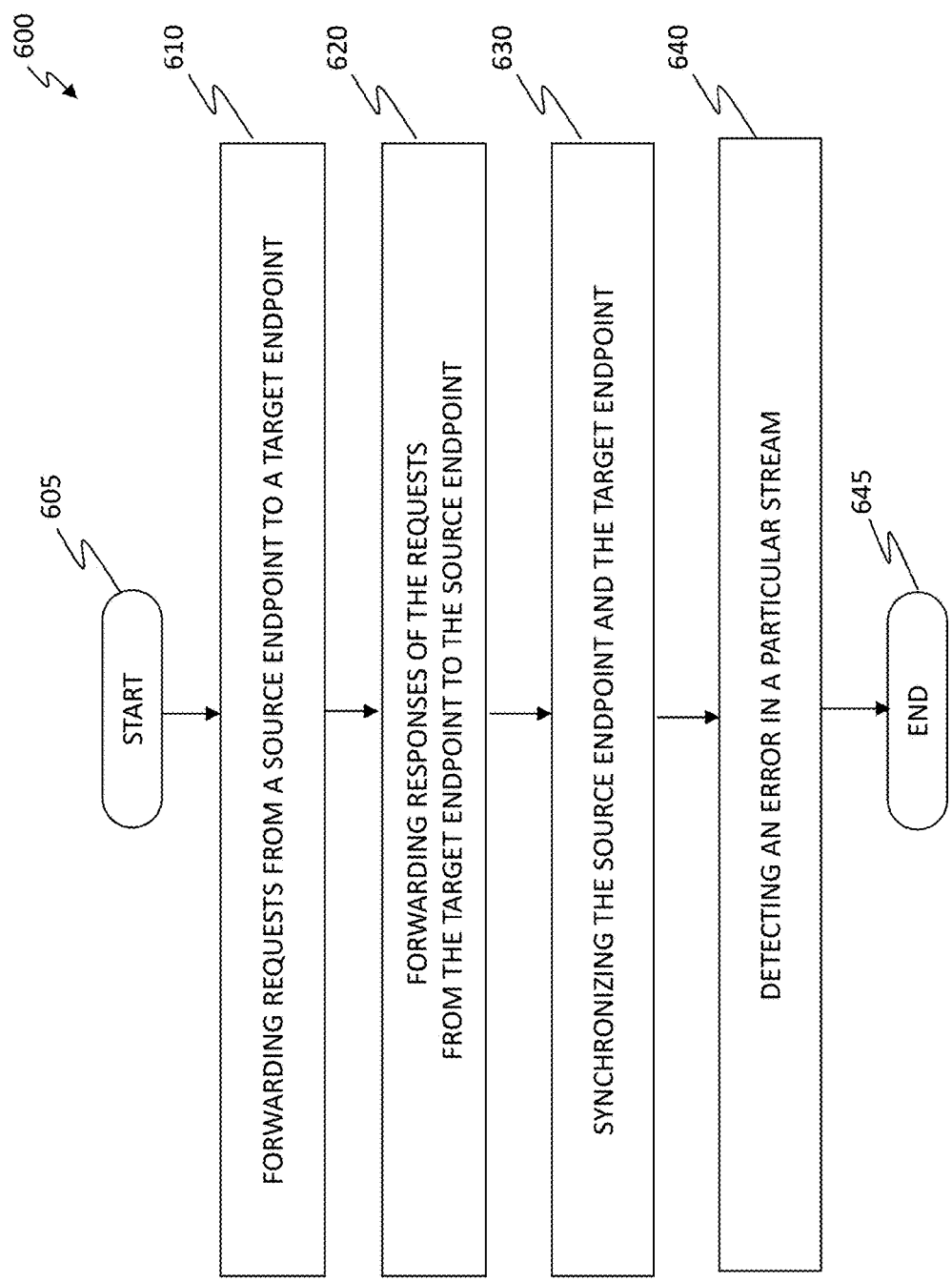
FIG. 6 is a flow chart of an embodiment of a method for operating an interconnect fabric.

FIG. 6 illustrates a flow chart of an embodiment of a method 600 for operating a fabric carried out according to the principles of the disclosure. The method 600 may be carried out by a switch or an endpoint connected to a fabric, such as 110 or 120 in FIG. 1, and more specifically by a collapsing structure, a tracking structure, a tag remapping structure, and a source-track structure, such as 200, 300, 400, and 500 in FIGS. 2-5. The method 600 starts at a step 605.

At step 610, requests from a source endpoint are forwarded to a target endpoint. The source and target endpoints generally refer to endpoints, such 120 in FIG. 1, which are connected to switches at the edge of the fabric. In the illustrated embodiment, the requests are non-posted write requests.

As discussed above with FIG. 4, in an interconnect fabric where transactions from multiple sources/streams are not distinguishable because original stream identifiers do not indicate streams that the requests belong to, the transactions are remapped before reaching their target endpoints. In the illustrated method 600, the transactions are hence remapped during the step 610. The remapping may be carried out by a tag remapping structure, such as the TRS 400 in FIG. 4.

The remapping includes changing original stream identifiers of collapsible and non-collapsible requests. When a request is not collapsible, its original stream identifier is changed with a unique stream identifier from a non-collapsible tag pool, such as 480 in FIG. 4. Whether a request is collapsible or not is determined by checking the TCEnable bit of the request.

When the request is collapsible, it is determined whether a particular stream that the request belongs is already being tracked in a collapsible tag memory, such as 420 in FIG. 4. If the particular stream is not already being tracked, the request is changed with a unique stream identifier from a collapsible tag pool, such as 440 in FIG. 4, and the particular stream is stored in the collapsible tag memory to be tracked. In some instances, the particular stream, though it is not already being tracked, cannot be stored in the collapsible tag memory because the memory is full. In such instances, the request is converted into a non-collapsible request and an original stream identifier of the request is changed with a unique stream identifier from the non-collapsible tag pool.

When the request is collapsible and belongs to one of the streams that are being tracked in the collapsible tag memory, the original stream identifier of the request is changed with a unique stream identifier associated with that one tracked stream and a collapse count for that one tracked stream is incremented.

It is understood that when collapsible and non-collapsible requests are remapped, their information is stored in the respective memories so that their responses can be mapped back to the original stream identifiers. For the collapsible requests, their information may be stored in the collapsible tag CAM such as 420 in FIG. 4, and for non-collapsible requests, their information may be stored in a non-collapsible tag memory such as 460 in FIG. 4.

When the requests reach the target endpoints, they are converted into responses and returned to the source endpoints. At step 620, the generated responses are forwarded from the target endpoints back to the source endpoints over the fabric.

During the step 620, the load, e.g., a number, of the responses on the fabric is reduced by collapsing some of the responses that belong to a same stream into a single collapsed response. The collapsing may be performed using a collapsing structure, such as 200 in FIG. 2. For each response, it is determined whether the response is collapsible, and if the response is not, it is forwarded back to the source endpoint. If the response is collapsible, it is compared to other collapsible responses that are stored in a collapse response memory, such as the CAMs 210s in FIG. 2.

If the compared collapsible response matches with one of the stored responses, i.e. the compared collapsible response belongs to one of the tracked streams, the collapse count, e.g., collapsedCnt, of the stored response is incremented by the collapse count value of the compared collapsible response and the compared collapsible response is discarded. If the collapsible response does not match any of the stored responses, i.e. the compared collapsible response does not belong to one of the tracked streams, the compared collapsible response is stored into an available slot of the collapse response memory so that it can be compared and collapsed with other collapsible responses. But if no slot is available, the collapsible response is forwarded to another collapse response memory. When a predetermined time period expires or a collapse count value of a stored response reaches a maximum count, the stored response is released from the collapse response memory and forwarded to the source endpoint. As mentioned above, there may be other triggers for releasing the stored response.

Also if the requests of the forwarded responses have been remapped with the unique stream identifiers during the step 610, the forwarded responses' remapped unique stream identifiers are changed back to their original stream identifiers during the step 620. The remapping is performed by the same tag remapping structure that did the remapping during the step 610, using the stored information of the remapped requests.

For the non-collapsible responses, their original stream identifiers are retrieved from the non-collapsible tag memory, such as 460 in FIG. 4, and the unique stream identifiers are returned back to the non-collapsible tag pool, such as 480 in FIG. 4. For the collapsible responses, their original stream identifiers are retrieved from the collapsible tag memory, such as 420 in FIG. 4, and the collapse counts associated with the collapsible responses are decremented by the collapse count values of the collapsible responses. It is understood that if the non-collapsible response became non-collapsible because its request was converted due to the memory spill, the non-collapsible response is converted to a collapsible response by restoring its TCEnable value.

While performing the steps 610 and 620, the source and target endpoints may be synchronized by tracking transactions of streams and performing flush operations. This synchronization is performed at step 630 using tracking structures, such as 340 in FIG. 3. Multiple streams, which have been distributed across multiple tracking structures using a hash function, such as 320 in FIG. 3, are tracked using open and closed counters, such as 343 and 344 in FIG. 3, of the tracking structures. Each counter is assigned with an extended stream identifier, e.g., extTagID.

When a request of a particular stream arrives at the tracking structure, an open counter that is assigned to track that particular stream is incremented, and the extended stream identifier field of the request is updated with the extended stream identifier of the open counter to indicate which open counter is tracking the request. When a response of the particular stream arrives, the open counter decrements. For a collapsed response, the open counter decrements by the collapsed count value of the response.

A flush request for flushing a particular stream of transactions is received at one of the tracking structures that is tracking the particular stream. Upon receiving the flush request, if the closed counter of the tracking structure is empty, the open counter and the closed counter of the tracking structure are transitioned to opposite states. The transitioning makes the open counter to become the new closed counter that will track responses of the particular stream and also makes the formerly empty closed counter to be the new open counter that will track transactions of new streams.

Upon receiving the flush request, if the closed counter is not empty and has not reached zero, the open counter is remained open but marked to transition to the opposite state as soon as the closed counter reaches zero. As the open counter remains open and is assigned to track multiple streams, it continues to track incoming transactions and flush requests. Additional flush requests are stored in a FIFO, such as 342 in FIG. 3, so that they can be responded in order.

Once the closed counter reaches zero, all the flush requests that had arrived while the closed counter was an open counter are responded in order and the open and closed counters are transitioned to the opposite states. The extended stream identifier fields of the outstanding request are updated with the extended stream identifiers of the new open and closed counters. Lastly, the outstanding responses are updated by indexing on the stream identifiers and the extended stream identifiers in the headers of the responses.

While performing the steps 610 and 620, an error, e.g., a lost transaction, in a particular stream may be detected by tracking streams in the interconnect fabric individually. The error detection is performed at step 640 using a source-track structure such as 500 in FIG. 5. Each of the tracked streams is monitored using a pair of open and closed counters that update their counts based on incoming requests and responses. Each counter is assigned with an extended stream identifier. Multiple open counters are employed to track multiples streams. Each open counter is responsible for one stream, and when instructed, each transitions and moves its count to a respective closed counter. When the counts are moved to closed counters, a timer for each closed counter starts. When the closed counter does reach zero before the timer expires, at least one of the transactions of the tracked stream is considered lost and the source endpoint that generated the lost transaction is notified of such. The notification may be generated by the switch on which the tracking structure resides and may take the form of an interrupt.

It is understood that if hardware resource permits, the numbers of the closed counters and timers can be as high as the number of the open counters for precise tracking. It is also understood that the numbers of the closed counters and timers can be as low as one each when both the closed counter and the timer are synchronously time-multiplexed. The method 600 ends at step 645.

It is understood that various structures, e.g., the tracking structure, the collapsing structure, and the tag remapping structure, that actually performs the method 600 may not be in a same switch. However, it should be understood that these structures are at least implemented in each of the switches such that the method 600 can be performed by any one of the switches.

Those skilled in the art to which this application relates will appreciate that other and further additions, deletions, substitutions and modifications may be made to the described embodiments.

What is claimed is:

1. A method of operating a fabric comprising:
   forwarding requests from a source endpoint to a target endpoint; and
   forwarding responses of the requests from the target endpoint to the source endpoint, wherein, the forwarding the responses includes reducing a number of the responses by collapsing some of the responses that belong to a same stream into a single collapsed response, and wherein the collapsing includes:
   determining that at least one of the responses is collapsible;
   comparing the at least one collapsible response to other collapsible response; and
   if a stream identifier of the at least one collapsible response matches a stream identifier of the other collapsible response, incrementing a collapse count in the other collapsible response and discarding the at least one collapsible response.

2. The method of claim 1, wherein the collapsing further includes storing the at least one collapsible response if the stream identifier of the at least one collapsible response does not match the stream identifier of the other collapsible response.

3. The method of claim 1, wherein the collapsing further includes continuing to forward the other collapsible response to the source endpoint when a predetermined time period expires or when the collapse count reaches a maximum count or an expected response number for a stream, to which the other collapsible response belongs.

4. The method of claim 1, wherein the collapsing is performed using a content-addressable memory of a switch connected to the fabric.

5. The method of claim 1, wherein the forwarding the requests includes changing original stream identifiers of the requests with unique stream identifiers when the original stream identifiers do not indicate streams, to which the requests belong.

6. The method of claim 5, wherein the changing includes changing an original stream identifier of one of the requests with a unique stream identifier from a non-collapsible tag pool when the one request is not collapsible.

7. The method of claim 5, wherein the changing includes when one of the requests is collapsible and does not belong to tracked streams in a memory, changing an original stream identifier of the one request with a unique stream identifier from a collapsible tag pool and storing a stream, with which the unique stream identifier is associated, in the memory.

8. The method of claim 5, wherein the changing includes changing an original stream identifier of one of the requests with a unique stream identifier from a non-collapsible tag pool when the one request is collapsible and a stream, to which the one request belongs, cannot be tracked.

9. The method of claim 5, wherein the changing includes changing an original stream identifier of one of the requests with a unique stream identifier associated with a tracked stream and incrementing a collapse count of the tracked stream when the one request is collapsible and belongs to the tracked stream.

10. The method of claim 1 further comprising synchronizing the source endpoint and the target endpoint by tracking flush requests and responding to each of the flush requests when all transactions before the each flush request are completed.

11. The method of claim 10, wherein the tracking includes:
    incrementing an open counter of a tracking structure when a request of at least one stream arrives at the tracking structure and decrementing the open counter when a response of the at least one stream arrives at the tracking structure;
    receiving one of the flush requests at the tracking structure; and
    upon the receiving:
    if a closed counter of the tracking structure is empty or zero, transitioning the open and closed counters to opposite states; and
    if the closed counter has not reached zero, marking the open and closed counters to transition to the opposite states when the closed counter reaches zero and continuing to track incoming transaction and flush request on the open counter.

12. The method of claim 11, wherein the tracking further includes when the closed counter reaches zero, responding to all flush requests that arrived while the closed counter was the open counter and transitioning the open and closed counters to the opposite states.

13. The method of claim 12, wherein the transitioning the open and closed counters to the opposite states includes updating extended stream identifiers of transactions to be tracked by a new open counter.

14. The method of claim 1, further comprising detecting an error in a particular stream by determining whether all transactions of the particular stream are completed within a predetermined time period.

15. The method of claim 14, wherein the determining includes tracking responses of the particular stream using a closed counter of a source-track structure, and when the closed counter does not reach zero before a timer associated the closed counter expires, notifying the source endpoint that the error has occurred in the particular stream.

16. The method of claim 15, wherein the notifying includes clearing transactions of the particular stream from the source endpoint and the fabric.

17. The method of claim 15, wherein a usage of the timer is time-multiplexed and shared by multiple closed counters.

18. The method of claim 15, wherein a usage of the closed counter is time-multiplexed and shared by multiple open counters.

19. The method of claim 1, wherein the requests are non-posted write requests.

20. A device for operating a fabric comprising:
    a pipeline configured to forward requests from a source endpoint to a target endpoint and forward responses of the requests from the target endpoint to the source endpoint; and
    a collapsing structure implemented as a hardware circuit, connected to the pipeline and configured to reduce a load of the responses on the fabric by collapsing some of the responses that belong to a same stream into a single collapsed response, wherein the collapsing includes:
    determining that at least one of the responses is collapsible;
    comparing the at least one collapsible response to other collapsible response that is stored in the collapsing structure; and
    if a stream identifier of the at least one collapsible response matches a stream identifier of the other collapsible response, incrementing a collapse count in the other collapsible response and discarding the at least one collapsible response.

21. The device of claim 20, wherein the collapsing further includes storing the at least one collapsible response in the collapsing structure if the stream identifier of the at least one collapsible response does not match the stream identifier of the other collapsible response and the collapsing structure has an available slot.

22. The device of claim 20, wherein the collapsing structure is further configured to release the other collapsible response into the pipeline when a predetermined time period expires or when the collapse count reaches a maximum count or an expected response number for a stream that the other collapsible response belongs to.

23. The device of claim 20, wherein the collapsing structure is a content-addressable memory.

24. The device of claim 20 further comprising a tag remapping structure configured to change original stream identifiers of the requests with unique stream identifiers when the original stream identifiers do not indicate streams, to which the requests belong.

25. The device of claim 24, wherein an original stream identifier of one of the requests is changed with a unique stream identifier from a non-collapsible tag pool when the one request is not collapsible.

26. The device of claim 24, wherein when one of the requests is collapsible and does not belong to tracked streams in the tag remapping structure, an original stream identifier of the one request is changed with a unique stream identifier from a collapsible tag pool and a stream, with which the unique stream identifier is associated, is stored in the tag remapping structure.

27. The device of claim 24, wherein an original stream identifier of one of the requests is changed with a unique stream identifier from a non-collapsible tag pool when the one request is collapsible and a stream, to which the one request belongs, cannot be tracked by the tag remapping structure.

28. The device of claim 24, wherein an original stream identifier of one of the requests is changed with a unique stream identifier associated with a tracked stream in the tag remapping structure when the one request is collapsible and belongs to the tracked stream.

29. The device of claim 20 further comprising a tracking structure configured to synchronize the source endpoint and the target endpoint by tracking flush requests and responding to each of the flush requests when all transactions before the each flush request are completed.

30. The device of claim 29, wherein the tracking structure includes an open counter and a closed counter and the tracking includes:
  incrementing the open counter when a request of at least one stream arrives at the tracking structure and decrementing the open counter when a response of the at least one stream arrives at the tracking structure;
  receiving one of the flush requests at the tracking structure;
  upon the receiving:
    if the closed counter is empty or zero, transitioning the open and closed counters to opposite states; and
    if the closed counter has not reached zero, marking the open and closed counters to transition to the opposite states when the closed counter reaches zero and continuing to track incoming transaction and flush request on the open counter.

31. The device of claim 30, wherein the tracking further includes when the closed counter reaches zero, responding to all flush requests that arrived while the closed counter was the open counter and transitioning the open and closed counters to the opposite states.

32. The device of claim 31, wherein the transitioning the open and closed counters to the opposite states includes updating extended stream identifiers of transactions to be tracked by a new open counter.

33. The device of claim 20, further comprising a source-track structure configured to detect an error in a particular stream by determining whether all transactions of the particular stream are completed within a predetermined time period.

34. The device of claim 33, wherein the determining includes tracking responses of the particular stream using a closed counter of the source-track structure, and when the closed counter does not reach zero before a timer associated the closed counter expires, notifying the source endpoint that the error has occurred in the particular stream.

35. The device of claim 34, wherein a usage of the timer is time-multiplexed and shared by multiple closed counters.

36. The device of claim 34, wherein a usage of the closed counter is time-multiplexed and shared by multiple open counters.

37. The device of claim 20, wherein the requests are non-posted write requests.

38. A method of operating a fabric comprising:
  forwarding requests from a source endpoint to a target endpoint, wherein the forwarding the requests includes changing original stream identifiers of the requests with unique stream identifiers when the original stream identifiers do not indicate streams to which the requests belong to; and
  forwarding responses of the requests from the target endpoint to the source endpoint, wherein a number of the responses is less than a number of the requests.

39. The method of claim 38, wherein the changing includes when at least one of the requests is collapsible and does not belong to tracked streams in a memory, changing an original stream identifier of the at least one request with a unique stream identifier from a collapsible tag pool and storing a stream, with which the unique stream identifier is associated, in the memory.

40. The method of claim 38, wherein the changing includes changing an original stream identifier of at least one of the requests with a unique stream identifier from a non-collapsible tag pool when the at least one request is collapsible and belongs to a stream that cannot be tracked.

41. The method of claim 38, wherein the changing includes changing an original stream identifier of at least one of the requests with a unique stream identifier associated with a tracked stream and incrementing a collapse count of the tracked stream when the at least one request is collapsible and belongs to the tracked stream.

* * * * *